US010378944B2

(12) United States Patent
Sun

(10) Patent No.: US 10,378,944 B2
(45) Date of Patent: Aug. 13, 2019

(54) WATER INTAKE TRACKER FOR A CONTAINER

(71) Applicant: Lin Sun, Highlands Ranch, CO (US)

(72) Inventor: Lin Sun, Highlands Ranch, CO (US)

(*) Notice: Subject to any disclaimer, the term of this patent is extended or adjusted under 35 U.S.C. 154(b) by 193 days.

(21) Appl. No.: 15/170,667

(22) Filed: Jun. 1, 2016

(65) Prior Publication Data

US 2017/0067770 A1    Mar. 9, 2017

Related U.S. Application Data

(60) Provisional application No. 62/141,971, filed on Apr. 2, 2015.

(51) Int. Cl.
*G01F 15/06* (2006.01)
*G01F 13/00* (2006.01)
*H04Q 9/00* (2006.01)

(52) U.S. Cl.
CPC .......... *G01F 15/063* (2013.01); *G01F 13/008* (2013.01); *H04Q 9/00* (2013.01); *H04Q 2209/43* (2013.01); *H04Q 2209/84* (2013.01); *H04Q 2209/86* (2013.01)

(58) Field of Classification Search
CPC ..................................................... G01F 15/063
See application file for complete search history.

(56) References Cited

U.S. PATENT DOCUMENTS

| | | | | |
|---|---|---|---|---|
| 6,302,836 | B1* | 10/2001 | North, Jr. | B01L 3/5021 494/10 |
| 7,235,406 | B1* | 6/2007 | Woudenberg | B01L 3/5027 422/50 |
| 9,138,091 | B2* | 9/2015 | Zhao | A47G 23/16 |
| 9,872,812 | B2* | 1/2018 | Malhi | A61H 9/0078 |
| 2003/0152994 | A1* | 8/2003 | Woudenberg | B01L 3/5027 435/6.12 |
| 2005/0158781 | A1* | 7/2005 | Woudenberg | B01L 3/5027 435/6.11 |
| 2006/0090563 | A1* | 5/2006 | Austerlitz | G01F 23/2961 73/290 V |
| 2007/0017291 | A1* | 1/2007 | Cypes | B01D 3/00 73/590 |

(Continued)

FOREIGN PATENT DOCUMENTS

CN    103217198    7/2013

*Primary Examiner* — Amine Benlagsir
(74) *Attorney, Agent, or Firm* — Sheridan Ross P.C.

(57) ABSTRACT

A system for tracking a volumetric change of a fluid or solid in a container is provided. A sensing device may be interconnected to any container, wherein the sensing device comprises a fluid sensor, an orientation sensor, and a communication unit for electronic communication. For example, the sensing device may communicate via Bluetooth® with an electronic device such as a smart phone. When the container is filled with a fluid, the sensing device senses drinking gestures and records any changes in the volume of the fluid. This information is transmitted to the electronic device wherein an application may keep track of various drinking events and notify a user of the same. Thus, the application may notify a user to drink water, alert the user of daily goals, etc. The sensing device and the overall fluid tracking system may serve as an intersection for users, friends, marketers, bottle makers, etc.

7 Claims, 21 Drawing Sheets

(56) References Cited

U.S. PATENT DOCUMENTS

| | | | | |
|---|---|---|---|---|
| 2008/0120046 A1* | 5/2008 | Tung | ............... | G01F 23/263 |
| | | | | 702/52 |
| 2009/0242386 A1* | 10/2009 | Minamisawa | ....... | B01D 67/006 |
| | | | | 204/192.11 |
| 2010/0274225 A1* | 10/2010 | Nishtala | ............ | A61B 5/036 |
| | | | | 604/514 |
| 2011/0144616 A1* | 6/2011 | Michaud | ............ | A61M 5/1413 |
| | | | | 604/500 |
| 2011/0201099 A1* | 8/2011 | Anderson | ............ | G01N 21/05 |
| | | | | 435/287.2 |
| 2013/0130369 A1* | 5/2013 | Wilson | ............ | B01L 3/5085 |
| | | | | 435/289.1 |
| 2013/0324928 A1* | 12/2013 | Kruse | ............ | A61M 5/142 |
| | | | | 604/151 |
| 2014/0095103 A1* | 4/2014 | Temko | ............ | B67D 3/0051 |
| | | | | 702/128 |
| 2014/0276409 A1* | 9/2014 | Rosinko | ............ | A61M 5/16831 |
| | | | | 604/111 |

\* cited by examiner

{transducer sensor data series:
{time: t, data: {l : 150, h: 400}}
{time: t+1, data: {l : 145, h: 420}}
...
{time: t+n, data: {l : 200, h: 350}}
}

{capacitance sensor data series:
{time: t, data: { $C_{re}$:1, $C_{rt}$:34, $C_{lev}$:17, $C_{levc}$:81}}
{time: t+1, data: $C_{re}$:5, $C_{rt}$:93, $C_{lev}$:67, $C_{levc}$:145}}
...
{time: t+n, data: { $C_{re}$:8, $C_{rt}$:90, $C_{lev}$:12, $C_{levc}$:44}}
}

{motion data series:
{time: t, data: {Gx : 10, Gy: 40, Gz: 90}}
{time: t+1, data: {Gx : 20, Gy: 40, Gz: 60}}
...
{time: t+n, data: {Gx : 90, Gy: 0, Gz: 130}}
}

{drinking event dataset:
{time: t, {motion: {Gx : 10, Gy: 40, Gz: 90}}, {transducer sensor: {l : 150, h: 400}}}
{time: t+1, {motion: {Gx : 20, Gy: 40, Gz: 60}}, {transducer sensor: {l : 145, h: 420}}}
...
{time: t+n, {motion: {Gx : 90, Gy: 0, Gz: 130}}, {transducer sensor: {l : 200, h: 350}}}
}

{drinking event dataset:
{time: t, {motion: {Gx : 10, Gy: 40, Gz: 90}}, {capacitance sensor: { $C_{re}$:1, $C_{rt}$:34, $C_{lev}$:17, $C_{levc}$:81}}}
{time: t+1, {motion: {Gx : 20, Gy: 40, Gz: 60}}, {capacitance sensor: { $C_{re}$:5, $C_{rt}$:93, $C_{lev}$:67, $C_{levc}$:145}}}
...
{time: t+n, {motion: {Gx : 90, Gy: 0, Gz: 130}}, {capacitance sensor: { $C_{re}$:8, $C_{rt}$:90, $C_{lev}$:12, $C_{levc}$:44}}}
}

FIG.14

WATER INTAKE TRACKER FOR A CONTAINER

CROSS REFERENCE TO RELATED APPLICATIONS

This application claims priority under 35 U.S.C. § 119(e) to U.S. Provisional Patent Application Ser. No. 62/141,971 filed Apr. 2, 2015, which is incorporated herein in its entirety by reference.

FIELD OF THE INVENTION

The invention generally relates to a device, a system, and/or a method that tracks a user's consumption of a fluid in a container, and relays that consumption to an electronic device.

BACKGROUND OF THE INVENTION

Containers have evolved in recent years to meet the demands of users. Water bottles and larger storage containers have significantly grown in popularity with both disposable and reusable water bottles becoming commonplace in contemporary society. The portability of these containers allows a user to consume fluids during strenuous exercise activity, during the work day, or while enjoying leisure activities.

Convenient consumption serves many functions for a user, including hydration. The Institute of Medicine generally recommends that women intake approximately 91 ounces of water per day and that men intake approximately 125 ounces of water per day to maintain proper hydration. However, these are broad guidelines, and the water intake for a given person varies depending on several factors. For example, the Mayo Clinic states that exercise, environment, heath conditions, and pregnancy are all factors that may affect the optimal water intake for a given person.

With this many factors, a user may have difficulty in keeping track of water intake in order to assess whether the user is properly hydrated or not. Some prior art containers have features that aid a user in determining water intake. For example, some bottles are made of translucent or transparent material and have markings on the outer surface of the bottle to indicate various volumes, much like a measuring cup. However, these markings require that the user physically record different markings at different times to track the user's water intake.

More recently, some containers have incorporated sensors to help track a user's water intake. Examples of these devices include the BluFit Bottle, the Vessyl bottle, and the Hydrocoach. Some of these devices comprise a weight scale and a pressure sensor at the bottom of the bottle to record weight or pressure from the drinking container and a microcontroller to compute water intake based on weight or pressure changes over time. One disadvantage of these containers is that the weight scale and pressure sensors are restricted to the particular type, size or shape of the container. A user may accumulate several containers or use different containers in different situations, and thus, would need to buy a completely new sensor system for each container.

Other devices incorporate a flow sensor system into a straw to record the mass or volume flow of a beverage moving through the straw and, similarly, compute water intake based on mass or volume change over time. The drawback with these devices is that they necessitate the use of a straw to use the flow sensor system, which adds costs and a user may find a straw disadvantageous for a particular use of the container.

Therefore there is a need for a device, a system, and/or a method for tracking fluid consumption that is not limited to a particular container or necessitates the use of additional components such as a straw.

SUMMARY OF THE INVENTION

It is thus an aspect of embodiments of the invention to provide a fluid tracking system wherein a device interconnects to a container to sense the volumetric changes of a fluid in the container. Specifically, it is an aspect of embodiments of the invention to provide a fluid tracking system that is modular in nature, and tracking devices may interconnect to any container regardless of the container's size and shape, which decreases production costs and simplifies the process of tracking water intake.

It is another aspect of the invention to provide a fluid tracking system with a device wherein the sensing device comprises fluid sensing and orientation sensing capabilities. These functions may be fulfilled by a fluid sensor and an orientation sensor in some embodiments. The fluid sensor may require physical contact with the fluid in the container, for example, when the fluid sensor is a pressure transducer. In other embodiments, the fluid sensor may not require physical contact with the fluid in the container, for example, when the fluid sensor is a capacitance sensor. In various embodiments, the orientation sensor is a plurality of accelerometers that may sense the orientation of the sensing device, and thus the container, in three dimensions. Yet in other embodiments, a plurality of fluid sensors may determine enough information regarding the orientation of the container to fulfill both the fluid sensing and orientation sensing capabilities.

It is an aspect of the invention to provide a fluid tracking system with a sensing device that is in electronic communication with an electronic device and/or an application. The sensing device may comprise a communication unit in some embodiments that is in electronic communication with an electronic device such as a smart phone, personal assistance device, tablet computer, notebook computer, etc. A protocol such as Bluetooth® or other similar devices may be used to provide the electronic communication. Data from the sensing device's sensors may be processed on an application on the electronic device or an application on a remote device such as a server. In the latter case, the electronic device may be in electronic communication with the server. Once the data is processed, notifications and alerts may be sent to a user on a display unit of the electronic device.

It is another aspect of embodiments of the invention to provide a fluid tracking system that may be incorporated into a new container or used to retrofit an existing container. Millions of containers have been manufactured, and will be continued to be manufactured, without modification to the structure of the container. Thus, some embodiments of the invention may have a fluid tracking system that uses an unobtrusive means to detect a fluid within a container such as a capacitance sensor.

It is a further aspect of embodiments of the invention to provide a fluid tracking system that detects volumetric changes in materials besides fluids. For example, embodiments of the invention may be used to track volumetric changes in solids. Thus, when a user fills a container with sugar or flour, the user may track any change in volume using the fluid tracking system.

One particular embodiment of the invention is a system for tracking volumetric changes of a fluid in a container, comprising a container having a shape that defines a container volume, wherein the container has a spatial orientation; a sensing device interconnected to the container, the sensing device comprising an orientation sensor for detecting the spatial orientation of the container; a fluid sensor for detecting a volume of a fluid in the container volume, wherein after the orientation sensor detects a change in the spatial orientation of the container, the sensing device generates an event dataset with the fluid volume information; and a communication unit configured to transmit the event dataset with the fluid volume information to an electronic device.

In various embodiments, the orientation sensor may comprise a plurality of accelerometers configured to detect the spatial orientation of the container in three spatial dimensions. In some embodiments, the fluid may be a pressure sensor and the container comprises an aperture, wherein the fluid sensor detects a pressure of the fluid through the aperture of the container. In various embodiments, the electronic device may be configured to calculate a change in the volume of the fluid based on the event dataset. In some embodiments, the system may further comprise a display unit positioned on the electronic device, wherein the change in the volume of the fluid is presented on the display unit. In various embodiments, an alert may be presented on the display unit when the strength of an electronic communication signal between the communication unit of the sensing device and the electronic device falls below a predetermined amplitude.

In some embodiments, an electronic communication protocol between the communication unit of the sensing device and the electronic device may be at least one of a Bluetooth, a Wi-Fi, a Zigbee, an infrared (IR) data transmission, a radio, a visible light communication (VLC), a cellular data service, and a Near Field Communication (NFC). In some embodiments, the fluid sensor may be a capacitance sensor, wherein the capacitance sensor is configured to detect changes in the dielectric constant of a material of a wall of the container. In various embodiments, the system may further comprise an identification unit of the sensing device, wherein the identification unit is configured to store the shape that defines the container volume in a non-transitory computer-readable storage medium.

Another embodiment of the present invention is a method for tracking volumetric changes of a fluid in a container, comprising (i) providing a container having a shape that defines a container volume, wherein a sensing device is interconnected to the container, and the sensing device comprises a fluid sensor and a communication unit; (ii) detecting, by the fluid sensor, a volume of a fluid in the container volume, wherein the sensing device generates an event dataset with the fluid volume information; and (iii) transmitting, by the communication unit, the event dataset with the fluid volume information to an electronic device.

Some embodiments of the method may further comprise (iv) sensing, by an orientation sensor, a spatial orientation of the container, wherein sensing device generates the event dataset with the fluid volume information after the orientation sensor detects a change in the spatial orientation of the container. In various embodiments, the orientation sensor may comprise a plurality of accelerometers configured to detect the spatial orientation of the container in three spatial dimensions. Some embodiments of the method may further comprise (v) detecting, by the fluid sensor, an apparent fluid level when the container is deflected at an angle from a vertical axis; and (vi) calculating, by the electronic device, an upright fluid level based on the apparent fluid level. Various embodiments of the method may further comprise (vii) calculating, by the electronic device, a change in the volume of the fluid based on a change in the upright fluid level before and after a drinking gesture.

Some embodiments of the method may further comprise (viii) calculating, by the electronic device, a change in the volume of the fluid based on the event dataset; and (ix) displaying the change in the volume of the fluid on a display unit positioned on the electronic device. In various embodiments, the fluid sensor may be a pressure sensor and the container comprises an aperture, wherein the fluid sensor detects a pressure of the fluid through the aperture of the container. In some embodiments, the fluid sensor may be a capacitance sensor, wherein the capacitance sensor is configured to detect changes in the dielectric constant of a material of a wall of the container. Various embodiments of the method may further comprise (x) presenting an alert on the display unit when the strength of an electronic communication signal between the communication unit of the sensing device and the electronic device falls below a predetermined amplitude. Some embodiments of the method may further comprise (xi) storing, on an identification unit of the sensing device, the shape that defines the container volume in a non-transitory computer-readable storage medium.

A further embodiment of the present invention is a system for tracking volumetric changes of a fluid in a container, comprising a container having a shape that defines a container volume, wherein the container has a spatial orientation; a sensing device interconnected to the container, the sensing device comprising an orientation sensor for detecting the spatial orientation of the container, wherein the orientation sensor comprises a plurality of accelerometers configured to detect the spatial orientation of the container in three spatial dimensions; a fluid sensor for detecting a volume of a fluid in the container volume, wherein the fluid sensor is a pressure sensor and the container comprises an aperture, wherein the fluid sensor detects a pressure of the fluid through the aperture of the container, wherein after the orientation sensor detects a change in the spatial orientation of the container, the sensing device generates an event dataset with the fluid volume information; an identification unit of the sensing device, wherein the identification unit is configured to store the shape that defines the container volume in a non-transitory computer-readable storage medium; and a communication unit configured to transmit the event dataset with the fluid volume information to an electronic device, wherein the electronic device is configured to calculate a change in the volume of the fluid based on the event dataset and the shape that defines the container volume, and wherein the change in the volume of the fluid is presented on a display unit positioned on the electronic device.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the invention. Moreover, references made herein to "the invention" or aspects thereof should be understood to mean certain embodiments of the invention and should not necessarily be construed as limiting all embodiments to a particular description. The invention is set forth in various levels of detail in the Summary of the Invention as well as in the attached drawings and Detailed Description and no limitation as to the scope of the invention is intended by either the inclusion or non-inclusion of elements, components, etc. in this Summary of the Invention. Additional aspects of the invention will become more readily apparent from the Detailed Description particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

FIG. 14 is a diagram of various data structures that receive and construct event datasets comprising a time series of fluid sensor data and orientation sensor data;

Figure 1:
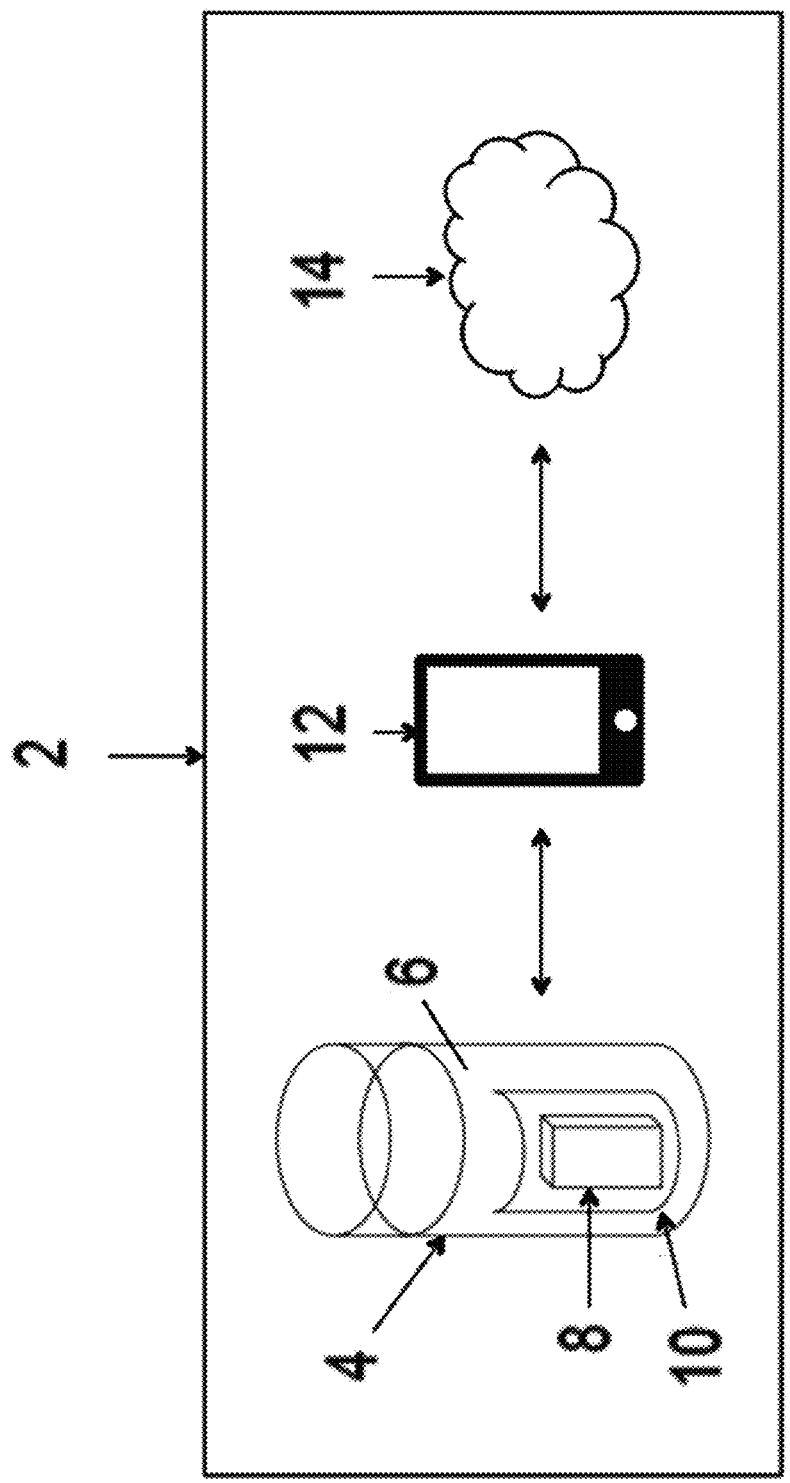
FIG. 1 is a side view of a fluid tracking system that comprises a container, a sensing device, an electronic device, and an application.

To assist in the understanding of the embodiments of the invention the following list of components and associated numbering found in the drawings is provided herein:

| Component No. | Component |
| --- | --- |
| 2 | Fluid Tracking System |
| 4 | Container |
| 6 | Fluid |
| 8 | Sensing Device |
| 10 | Mount |
| 12 | Electronic Device |
| 14 | Application |
| 16 | Fluid Sensor |
| 18 | Attachment Aperture |
| 20 | Identification Unit |
| 22 | Capacitance Circuit |
| 23 | Connection Port |
| 24 | Processing Unit |
| 26 | Universal Interface |
| 28 | Microcontroller |
| 30 | Power Unit |
| 32 | Orientation Sensor |
| 34 | Identification Reader |
| 36 | Communication Unit |
| 38 | Volume Change |

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, and may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the invention are described herein and as depicted in the drawings. It is expressly understood that although the figures illustrate containers, sensing devices, electronic devices, and applications, the invention is not limited to these embodiments.

Now referring to FIG. 1, a fluid tracking system 2 is provided. The fluid tracking system 2 generally comprises a container 4 and a sensing device 8 that is in electronic communication with an electronic device 12, which in turn is in electronic communication with an application 14. The container 4 is configured to receive a fluid or fluids 6. The sensing device 8 is interconnected to the container 4 via an optional mount 10 in some embodiments. The sensing device 8 senses a volumetric change in the fluid 6, for example, when a user consumes water from the container 4. In some embodiments the fluid 6 is in a liquid state such as water or a soft drink at room temperature. However, it will be appreciated that the fluid 6 may be a material in any state that can be housed in a container 4.

The sensing device 8 may transmit or receive data with the electronic device 12 via electronic communication for various functions including fluid tracking, notifications, alerts, daily goals, social network interconnectivity, etc. For example, the user may see the time and volume of his last water intake on the electronic device 12, the total water volume that he has consumed throughout the day, and percentage of his drinking goal. The user can also set reminder to himself to drink water at certain time intervals. Water intake data can also be shared using an application program interface ("API") with other mobile applications to track the user's health status, fitness goals and athletic performance level.

In one embodiment, the sensing device 8 utilizes a wireless data transmission protocol such as Bluetooth®. It will be appreciated that the wireless data transmission protocol may also be Infrared, WiFi, WiMax, 3G, LTE, etc. It will be further appreciated that the electronic communication and data transmission may be wired technologies such as Universal Serial Bus (USB) and Thunderbolt®.

Similarly, the electronic device 12 may be in electronic communication with an application 14, which may simply be on the electronic device itself. In other embodiments, the application 14 is a web-based application that is remotely located on one or more servers to provide some functionality or service in response to user requests received over a network using web protocols (i.e., HTTP, HTTPS, or something similar). An example of an application 14 is a database interface, wherein a database runs on a database system and users can access data in that database system by sending a request for service over the network to an application server. The application server receives the request for service and decides, according to how it is programmed, what to do with the request. It can ignore the request, send an error message back to the user, or trigger an operation with the database system and respond to the user's request by sending the user the results of the database operation.

Figure 2:
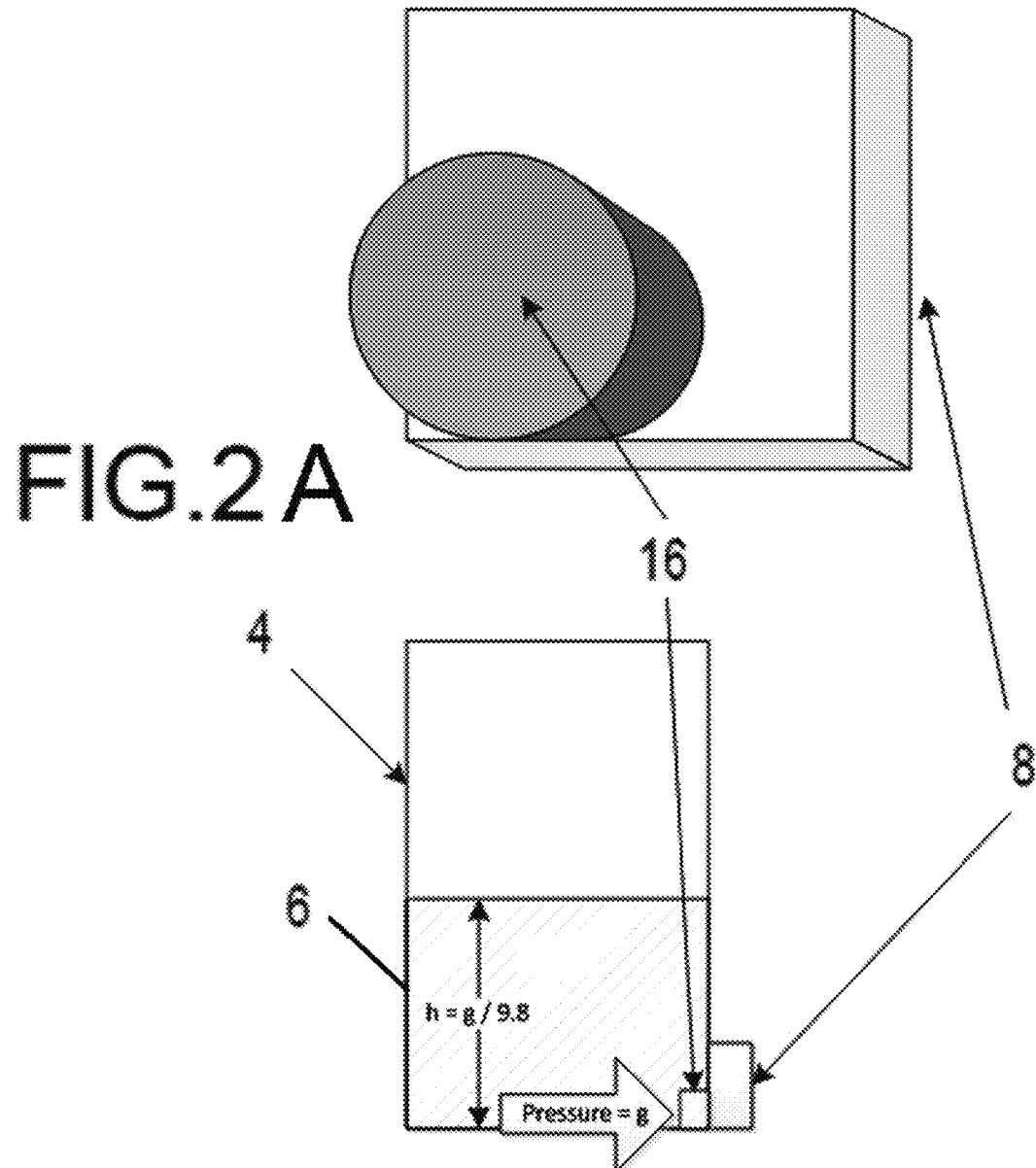
FIG. 2A is a perspective view of a sensing device comprising a fluid sensor.
FIG. 2B is a cross-sectional view of a sensing device interconnected to a container, wherein the sensing device comprises a fluid sensor.

Now referring to FIGS. 2A and 2B, a more detailed view of the sensing device 8 is provided. The sensing device 8 in FIG. 2A comprises a fluid sensor 16 which detects a characteristic or parameter of the fluid 6. In this embodiment, the fluid sensor 16 detects the pressure of the fluid 6 using the piezoelectric effect of bonded or formed strain gauge which is a thin film in FIG. 2A. Other fluid sensors 16 are discussed elsewhere herein.

The sensing device 8 in FIG. 2B is interconnected to a container 4 that comprises a fluid 6, and the sensing device 8 and its fluid sensor 16 may be used to calculate the volume of the fluid 6 in the container 4. The sensing device's 8 fluid sensor 16 physically contacts the fluid 6 via an aperture in the container 4. The fluid sensor 16 in this embodiment contacts the fluid 6 at the bottom of the container 4. The height or vertical level of the fluid 6 may be calculated using the formula $L=p/\rho g$ where L is the level of the fluid 6, p is the pressure detected by the fluid sensor 16, $\rho$ is the density of the fluid 6, and g is gravity. Once the level of the fluid 6 is known, the volume of the fluid 6 may be calculated because the width and depth of the container 4 are known and constant since the container 4 in FIG. 2B is cylinder. For other shapes, a function where volume depends on the level of the fluid 6, $V=f(L)$, may be calculated by geometry or derived using empirical methods.

Figure 3:
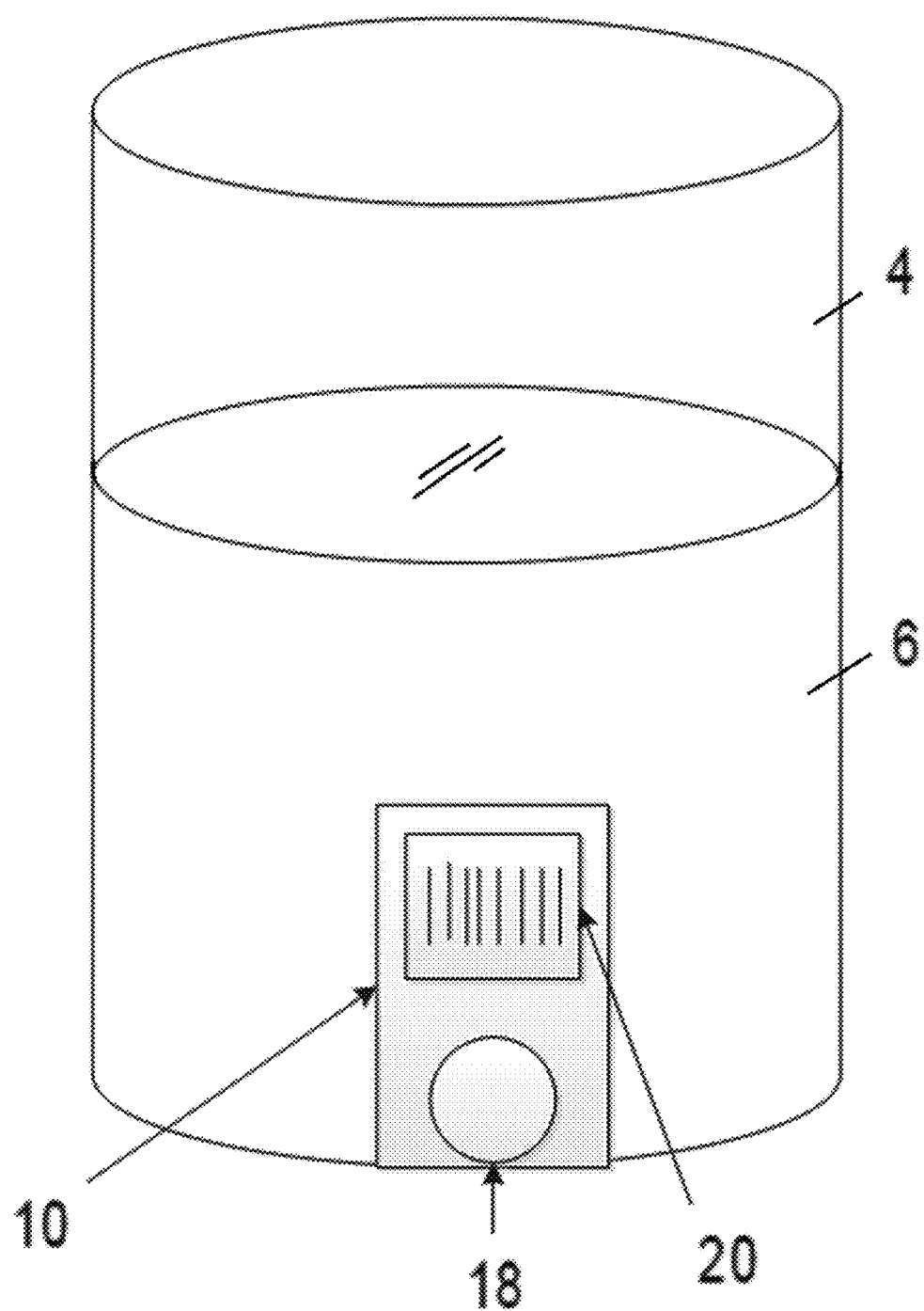
FIG. 3 is a side view of a container comprising a mount, an attachment aperture, and an identification unit.

Now referring to FIG. 3, a container 4 with a particular mount 10 is provided. This mount 10 comprises an attachment aperture 18 through which the fluid sensor 16 of a sensing device 8 may contact a fluid 6. The mount 10 is FIG. 3 also has an identification unit 20, which stores information regarding the container 4. The identification unit 20 may be a passive system such as a radio-frequency identification system, a barcode, a QR code, etc. The identification unit 20 may also be an active system in some embodiment that employs wireless or wired electronic communication protocols as discuss elsewhere herein. The identification unit 20 may store information such as the function $V=f(h)$ that describes the volume of the container 4, material properties of the container 4, etc.

Figure 4:
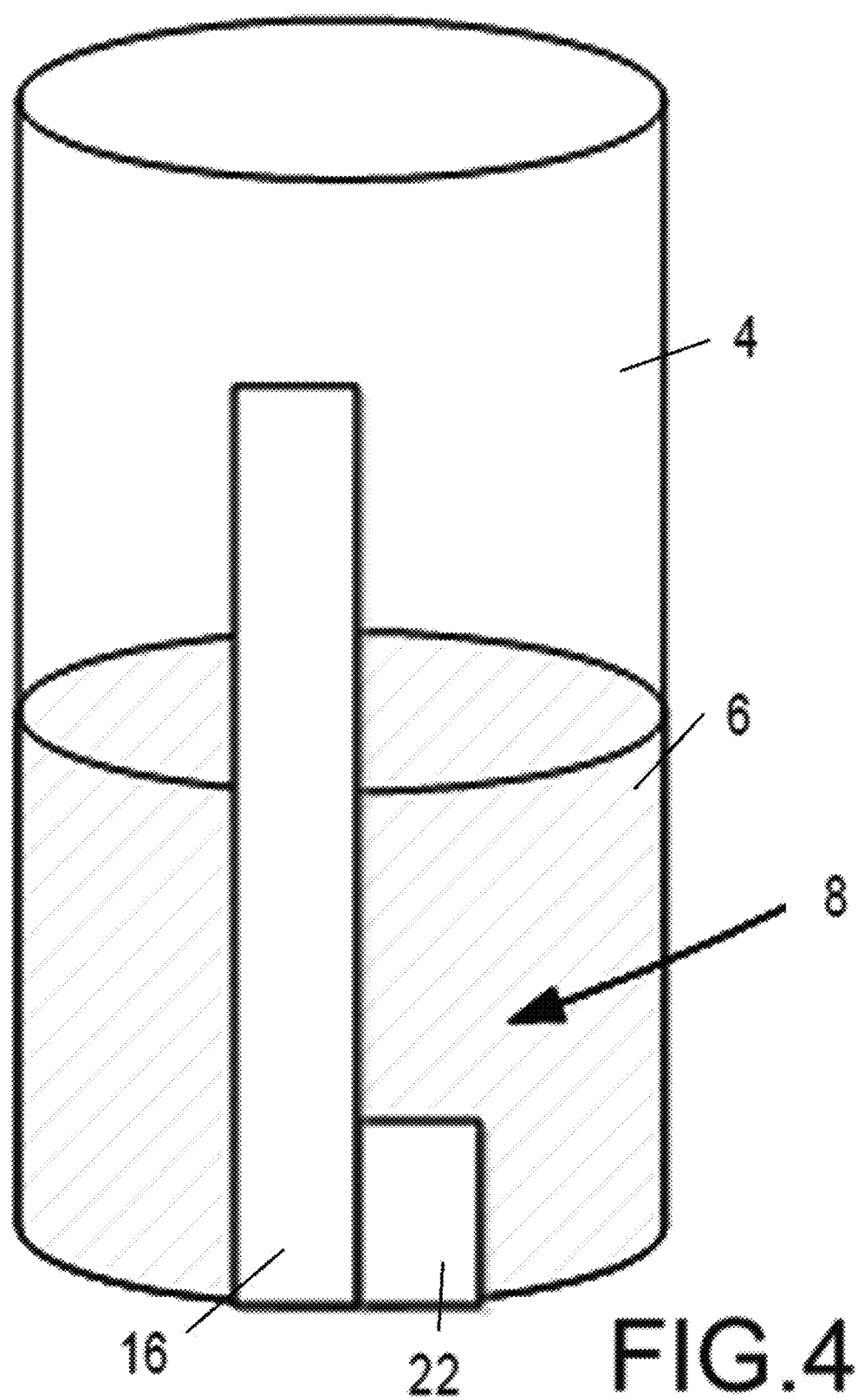
FIG. 4 is a side view of a container comprising a fluid sensor and a capacitance circuit.

Now referring to FIG. 4, a sensing device 8 is provided where the fluid sensor 16 is a capacitance sensor that detects changes in dielectric constant of the container 4 wall. As the fluid 6 is consumed, the dielectric constant changes. This type of fluid sensor 16 allows the sensing device 8 to detect the height or level of the fluid 6 without needing to directly contact the fluid 6. The sensing device 8 in this embodiment also comprises a capacitance circuit 22 used to accumulate data from the fluid sensor 16 among other functions. The capacitance values: $C_{re}, C_{rl}, C_{lev}, C_{lev0}$ are used to calculate the level of the fluid 6 in the container 4 using the formula $L=(C_{lev}-C_{lev0})/(C_{rl}-C_{re})$ where L is the level, $C_{lev}$ is the capacitance of the sensor when the container 4 is full of fluid 6, $C_{lev0}$ is the capacitance of the sensor when there is no fluid 6 in the container 4, $C_{rl}$ is the capacitance of a reference liquid sensor, and $C_{re}$ is the capacitance of a reference environmental sensor.

Figure 5A:
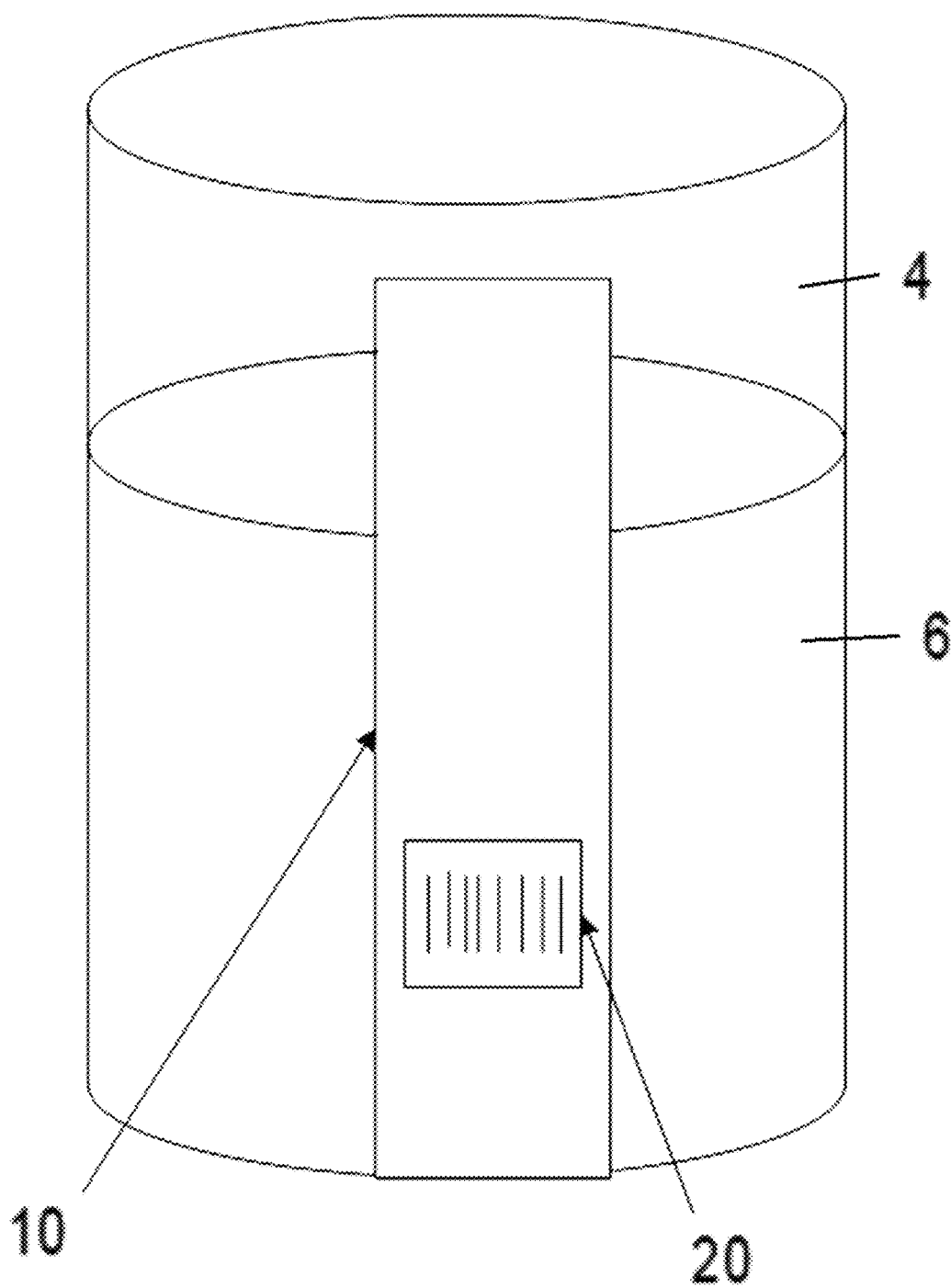
FIG. 5A is a side view of a container comprising a mount and a fluid sensor.

Now referring to FIG. 5A, a container 4 with a particular mount 10 for a capacitance sensor is provided. The mount 10 in this embodiment generally extends along the longitudinal length of the container 4 and provides a location for a capacitance sensor, for example the fluid sensor 16 of FIG. 4, to detect changes in the dielectric constant as a user consumes or adds fluid 6 to the container 4. In some embodiments, the container 4 is a non-conductive material such as plastic or glass that improves the performance of a capacitance sensor.

Figure 5B:
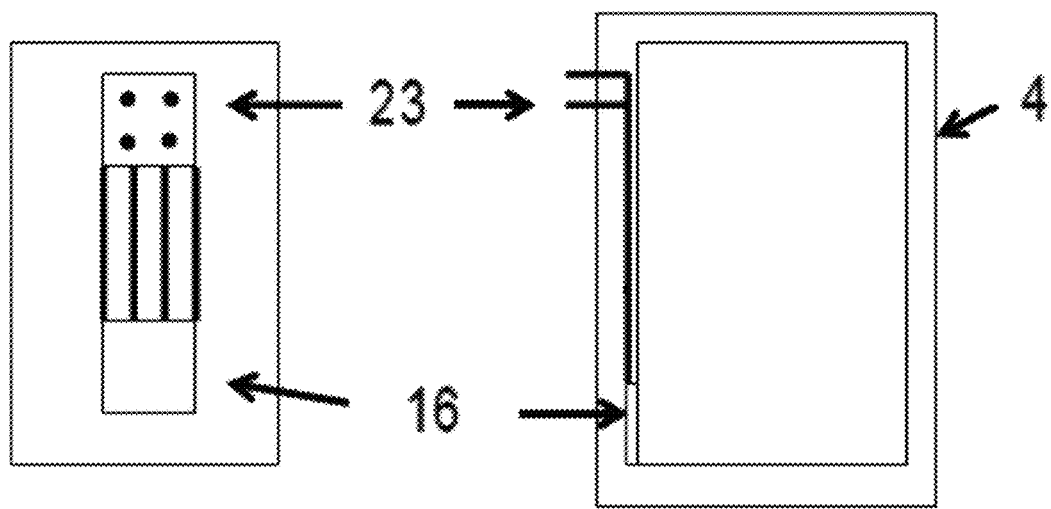
FIG. 5B is a side view of a container comprising a mount and a fluid sensor wherein the fluid sensor is embedded in the container.

Now referring to FIG. 5B, a container 4 with an embedded fluid sensor 16 is provided. A container 4 may be smart bottle-ready in a number of ways. The container 4 may comprise a mount configured to receive a sensing device as described elsewhere herein. However, it may not be advantageous to produce a smart bottle-ready container 4 with a mount in every instance. The container 4 in FIG. 5B comprises an embedded fluid sensor 16 that is interconnected to wires which lead to a connection port 23 on an outer surface of the container 4. A sensing device 8 may interconnect to the fluid sensor 16 via the connection port 23 to provide the variety of functions as described elsewhere herein. Embedding fluid sensors 16 is low cost, and the fluid sensor 16, wires, and the connection port 23 may be positioned anywhere on the container 4. While embedding may denote a complete encapsulation of the fluid sensor 16, the term may also encompass embodiments where the fluid sensor 16 is exposed to the container's 4 inner surface and/or the container's 4 outer surface.

Figure 6A:
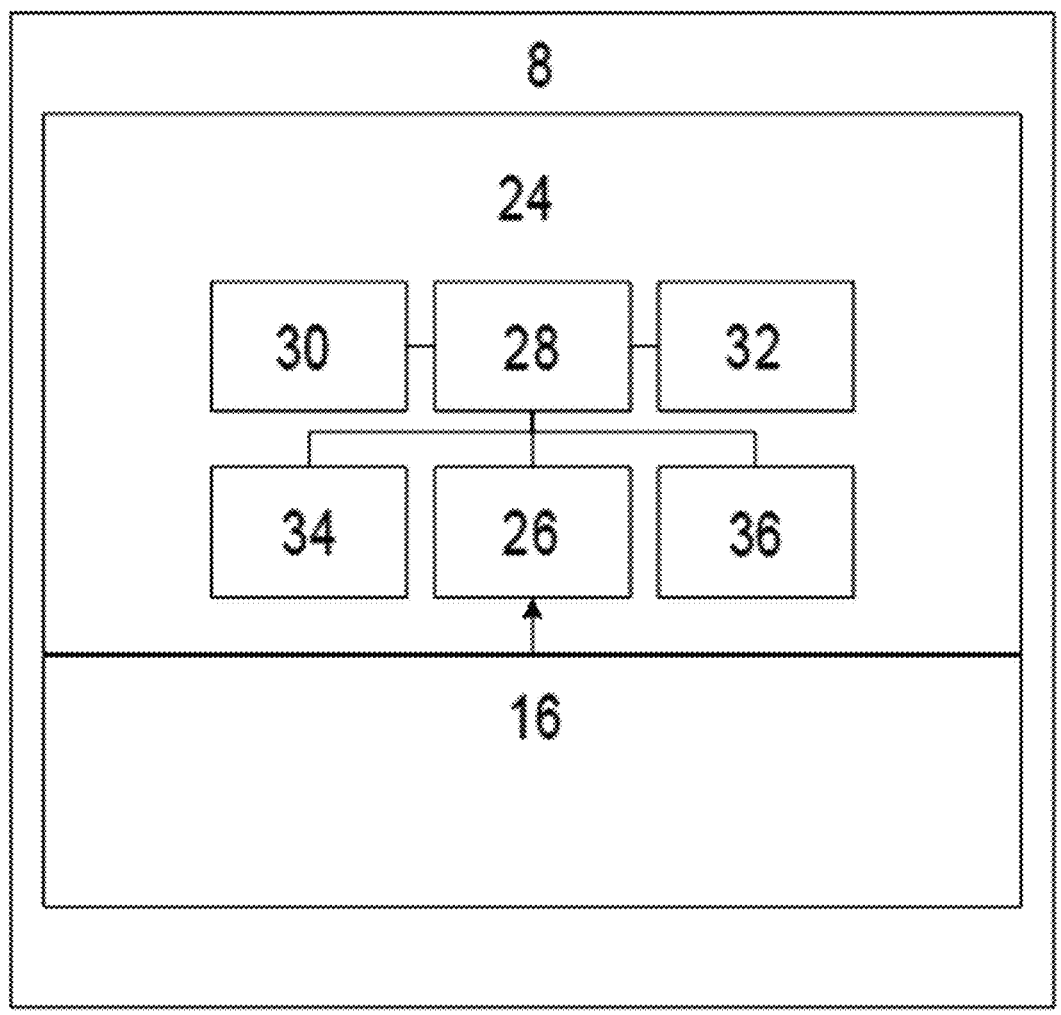
FIG. 6A is a diagram of a sensing device and its various components.

Now referring to FIG. 6A, an embodiment of the sensing device 8 and its various components is provided. As described elsewhere herein, the sensing device 8 has a fluid sensor 16. In this embodiment, the sensing device 8 also has a processing unit 24 that provides various functions for the sensing device 8. First, the processing unit 24 comprising a universal interface 26. The fluid sensor 16 is interconnected to the universal interface 26, which is able to receive data from a generic sensor and pass data along to the remaining components of the sensing device 8. Depending on the type of fluid sensor 16 (e.g., pressure sensor or capacitance sensor), the interconnection between the fluid sensor 16 and the universal interface 26 of the processing unit 24 may be a 2-pin connector, a 4-pin connector, etc.

Next, a microcontroller 28 is interconnected to the universal interface 26. The microcontroller 26 is a small computer with programmable input/output peripherals. A power unit 30 is interconnected to the microcontroller 26 to provide power to the microcontroller 26 and other components of the sensing device 8. In some embodiments, the power unit 30 may be a 3V battery.

Next, an orientation sensor 32 is interconnected to the microcontroller 26. The orientation sensor 32 detects changes in the position, velocity, acceleration, orientation, etc. of the sensing device 8, and by extension, the container 4. In the embodiment depicted in FIG. 6A, the orientation sensor 32 is a plurality of accelerometers that can sense a change in orientation of the sensing device 8 in three dimensions. Therefore, the orientation sensor 32 can detect movements that may correspond to a user taking a drink from the container 4 or the user filling the container 4 with a fluid 6. The orientation sensor 32 may also dictate a plurality of states of the sensing device 8. In a dormant state, the orientation sensor 32 does not detect any changes in the physical position of the sensing device 8, and thus, the power unit 30 supplies little or no power to the processing unit 24. In an active state, the orientation sensor 32 detects a particular change in the physical position of the sensing device 8, and the power unit 30 supplies power to the processing unit 24 such that the processing unit 24 may continuously evaluate data from the fluid sensor 16. This two-state configuration may improve the longevity of the power unit 30.

The processing unit 24 may also comprise an identification reader 34, which receives information from an identification unit 20 disposed on a container 4. As discussed elsewhere herein, the identification unit 20 may store information such as the dimensions of the container 4 or a function that describes the volume of the container in terms of the height or level of the fluid 6. Also discussed elsewhere herein is the communication protocol between the identification unit 20 and the identification reader 34, which includes, but is not limited to, barcodes, QR codes, and other wireless and wired communications.

The processing unit 24 may further comprise a communication unit 36 that is interconnected to the microprocessor 28. The communication unit 36 may be in electronic communication with an electronic device such that the communication unit 36 transmits and/or receives data from the electronic device. The data transmitted to the electronic device may include data from any one of the sensing device's 8 components. For example, data from the fluid sensor 16 may be sent to the electronic device via the communication unit 36 so that the electronic device may process the data to interpret any volumetric changes of the fluid in a container. In some embodiments, the communication unit 36 is configured to utilize the Bluetooth® protocol. However, it will be appreciated that the communication unit 36 may utilize other protocols discussed elsewhere herein.

Figure 6B:
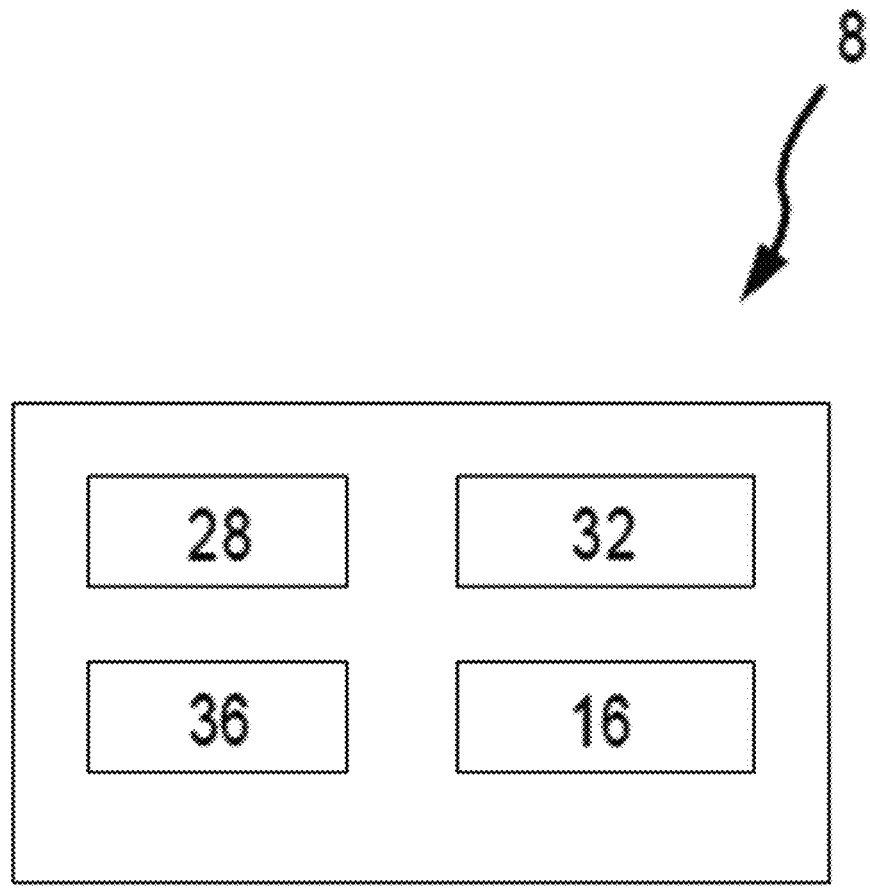
FIG. 6B is a diagram of a sensing device configured as a system-on-chip.

Now referring to FIG. 6B, an embodiment of the sensing device 8 is configured as a system-on-chip. The sensing device 8 comprises a fluid sensor 16, a microcontroller 28, an orientation sensor 32, and a communication unit 36. Thus, the sensing device 8 is constructed on a single chip that can minimize signal noise and reduce power consumption. Further, the sensing device in FIG. 6B may be precisely calibrated, mass produced, and placed at any number of locations on a container. It will be appreciated that embodiments of the system-on-chip sensing device 8 are not limited to the configuration in FIG. 6B. System-on-chip embodiments may comprise any combination or subcombination of sensing device 8 components discussed elsewhere herein.

Figure 7:
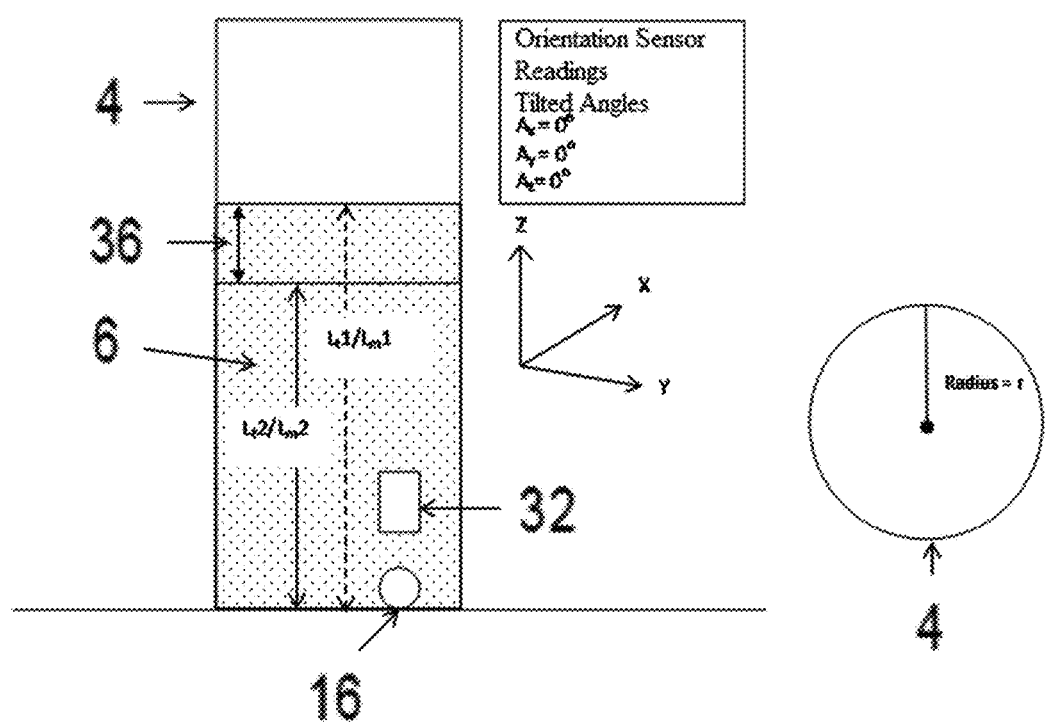
FIG. 7 is a cross-sectional view of a container with a fluid sensor and an orientation sensor where the container is set upright on a level surface.

Now referring to FIGS. 7-10, a side view of the container 4 is provided where the container 4 is in different orientations. The container 4 in FIG. 7 is set on a level surface. In this embodiment, $L_t$ is the height or level of the fluid 6 when the container 4 is upright on a level surface. $L_m$ is the apparent height or level of the fluid 6 when the container 4 is not upright on a level surface. For example, when the container 4 is resting on its side in a car seat, the apparent level $L_m$ may be a lower value than the upright level $L_t$. In the embodiment in FIG. 7, the upright level $L_t$ matches the apparent level $L_m$ and $L_t = L_m$.

The orientation sensor 32 measures the orientation of the container 6 in three dimensions, x, y, and z. As shown in FIG. 7, the container 6 is upright and the orientation sensor 32 returns angle readings of $A_x=0$, $A_y=0$, and $A_z=0$. Non-zero angle readings of $A_x$, $A_y$, and $A_z$ may be referred to as β, θ, and α, respectively. Therefore, $L_t$ may be expressed as a function of β, θ, α and the apparent level $L_m$ where $L_t = f(L_m, \beta, \theta, \alpha)$. As noted above, when the container 4 is upright and the angles $A_x$, $A_y$, and $A_z$ all equal 0, then $L_t = L_m$.

A change in volume 36 may be calculated from the level and angle measurements. A radius of the container 4 is "r", and two level readings are $L_{t1}$ and $L_{t2}$ where $L_{t1}$ is taken before a change in volume such as a drinking event and $L_{t2}$ is taken after. Therefore, given that the container 4 in FIG. 7 is a cylinder, the volume change 36 may be calculated using the equation $\Delta V = (L_{t1} - L_{t2}) \pi r^2$.

Figure 8:
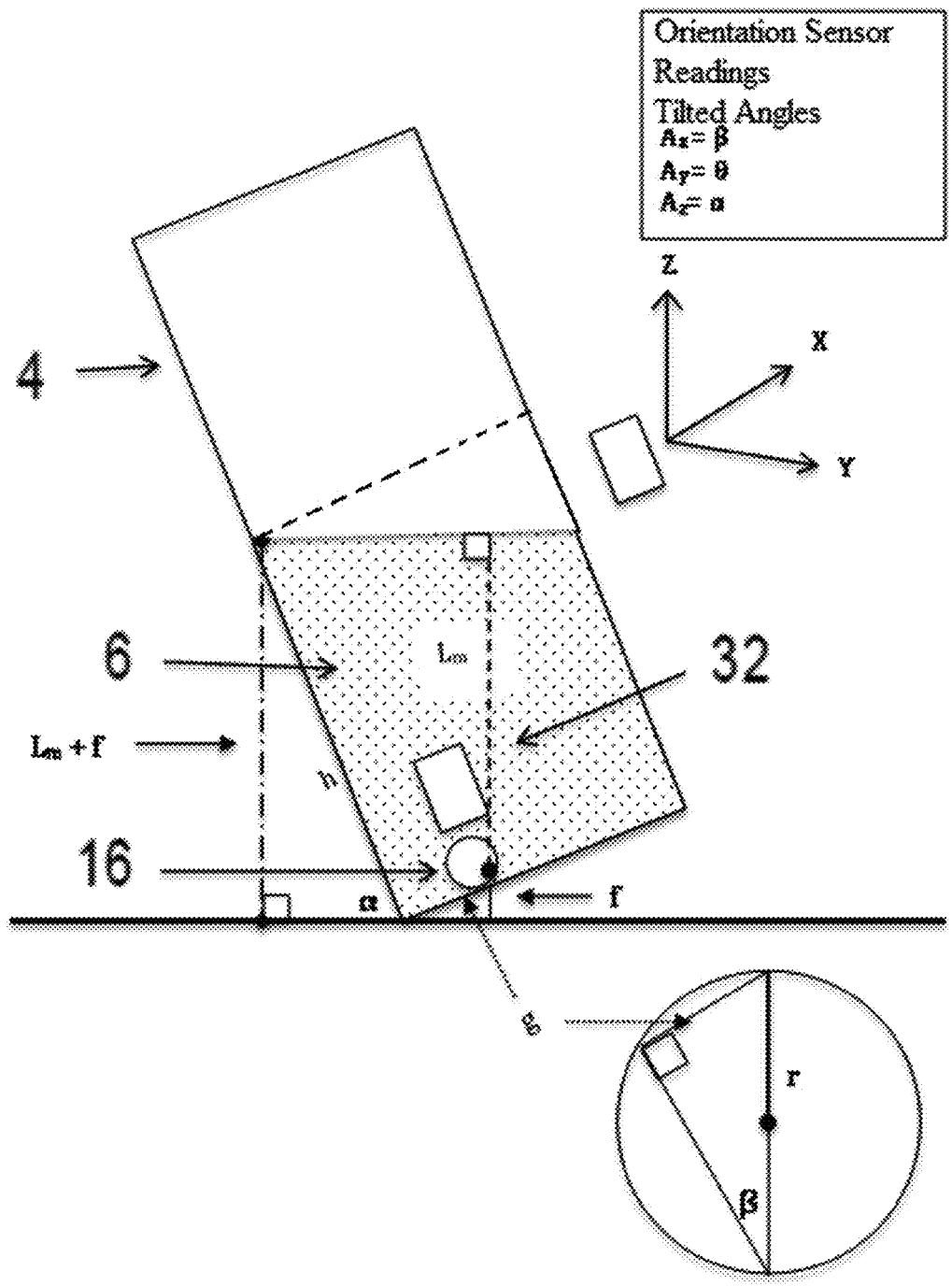
FIG. 8 is a cross-sectional view of a container with a fluid sensor and an orientation sensor where the container is angled, and a fluid covers a bottom surface of the container.

Now referring to FIG. 8, a container 4 with a fluid sensor 16 and an orientation sensor 32 is provided where the container 4 is not positioned upright on a level surface. Angles $A_x$, $A_y$, and $A_z$ are values β, θ, and α, respectively. The level $L_t$ may be calculated using the variables g, f, and h as shown in FIG. 8 wherein h is the highest position of the fluid 6 along the side of the container 4. g, f, and h are calculated using the formulas $g=\sin(\beta)2r$, $f=\cos(\alpha)g$, and $h=(L_m+f)/\sin(\alpha)$. Once h is solved for, $L_t$ may be calculated using the formula $L_t=h-r/(\tan(\alpha))$. This collection of angles, equations, and values is applicable when the fluid 6 completely covers the bottom surface of the container 4.

Figure 9:
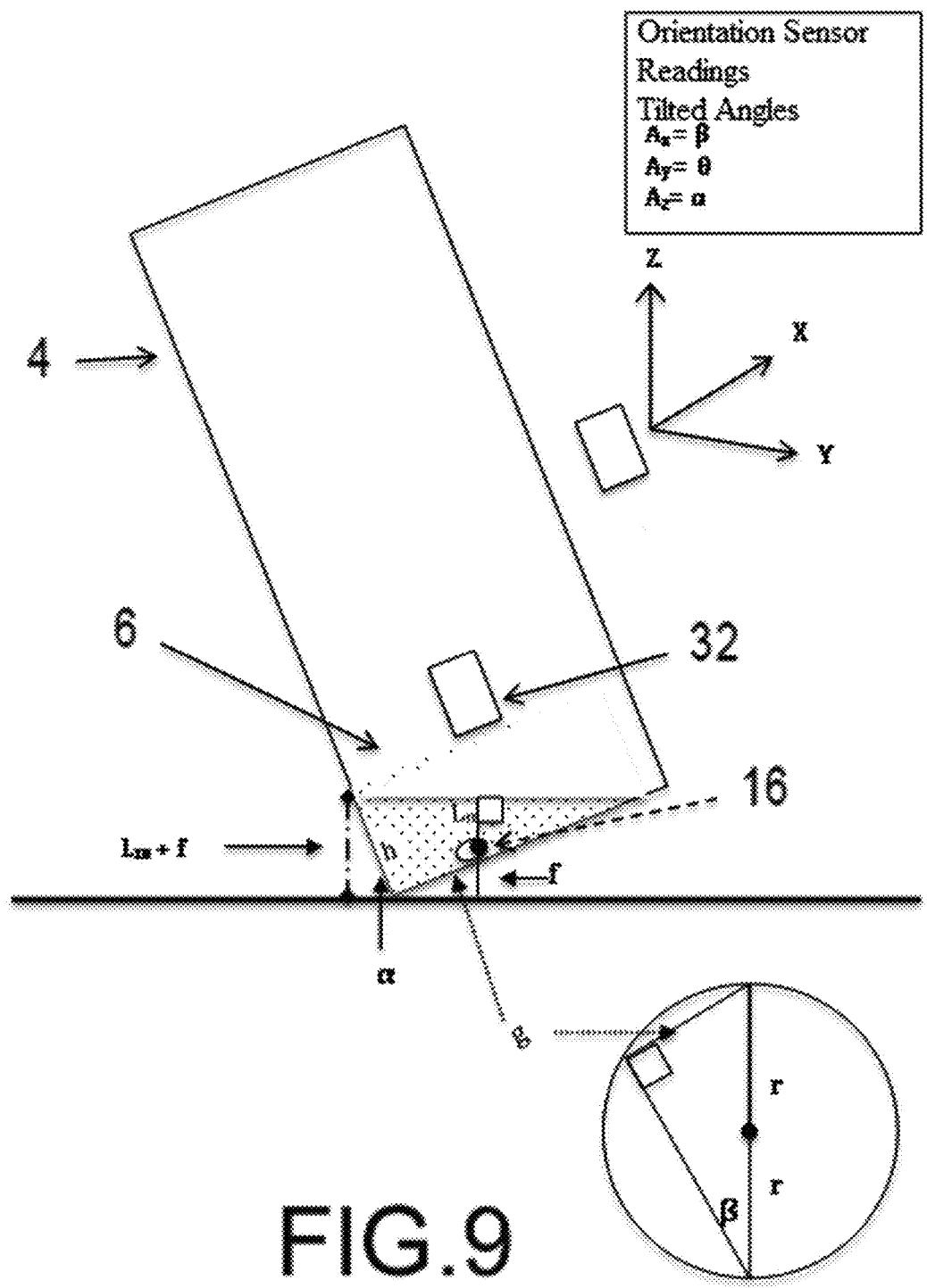
FIG. 9 is a cross-sectional view of a container with a fluid sensor and an orientation sensor where the container is angled, and a fluid covers only a portion of a bottom surface of the container.

Now referring to FIG. 9, a container 4 with sensors is provided where the container 4 is not positioned upright on a level surface, and the container's 4 fluid 6 does not completely cover the bottom surface of the container 4. In this instance, $L_t$ may be calculated using the formula $L_t=r/(\pi \tan(\alpha))\int_0^h \arccos(u)-u\sqrt{1-u^2}du$ where $u=(r-x\tan(\alpha))/r$.

Figure 10:
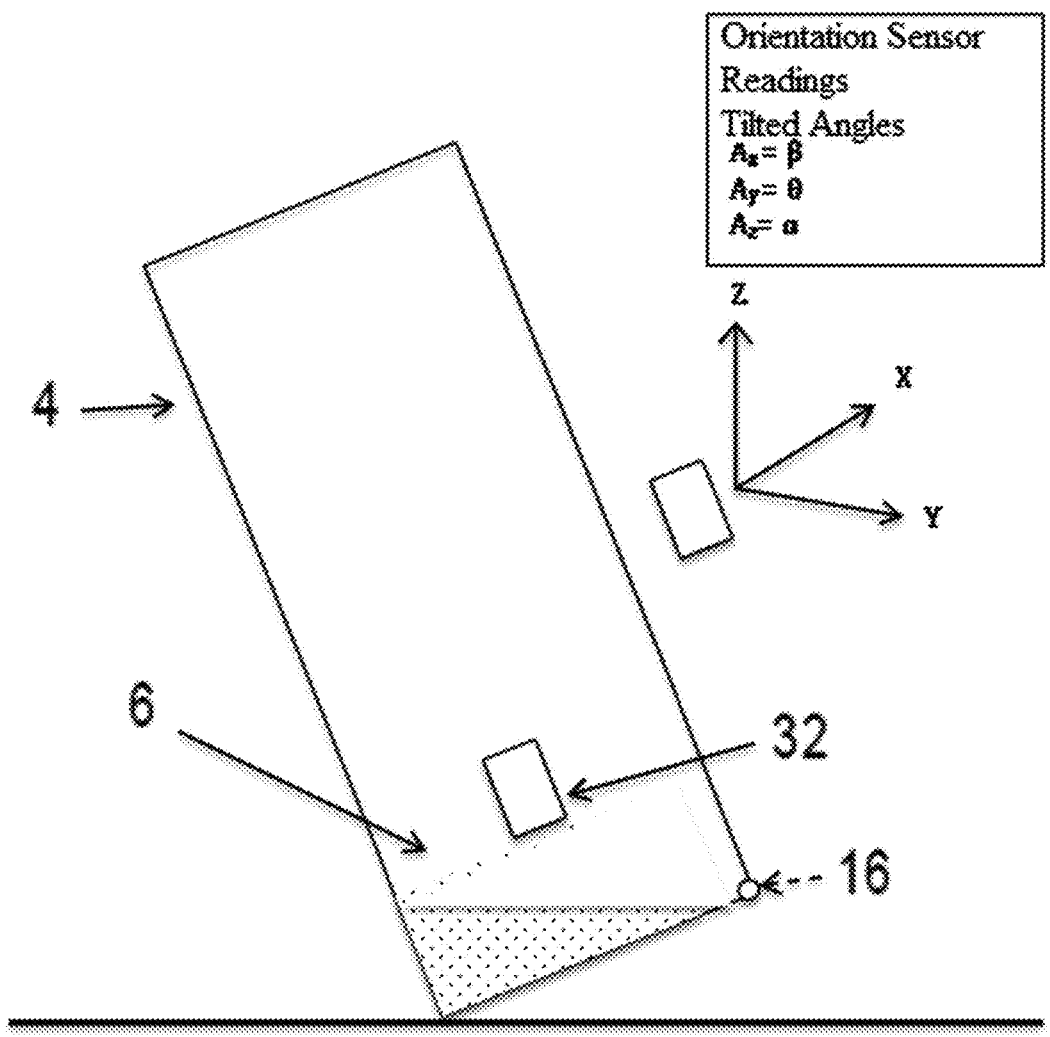
FIG. 10 is a cross-sectional view of a container with a fluid sensor and an orientation sensor where the container is angled, and the fluid sensor is positioned above a fluid in the container.

Now referring to FIG. 10, the container 4 is angled such that the fluid sensor 16 is above the fluid 6, and thus the fluid sensor 16 does not record any readings. In other words, if the fluid sensor 16 is a pressure transducer, then the fluid sensor 16 does not detect any pressure readings above the ambient or environmental pressure. However, the orientation sensor 32 detects that the container 4 is angled, and the location of the fluid sensor 16 on the container 4 is known. Therefore, the sensing device and its processing unit may calculate a maximum possible residual, or the total amount of fluid 6 that may go undetected by the fluid sensor 16 given the orientation of the container 4 and the location of the fluid sensor 16. This artifact or error may be accounted for in various ways. For example, alerts and notifications to the user may be suspended given that the sensing device cannot confirm a volume change 36 with the container 4 in the particular orientation in FIG. 7.

Figure 11:
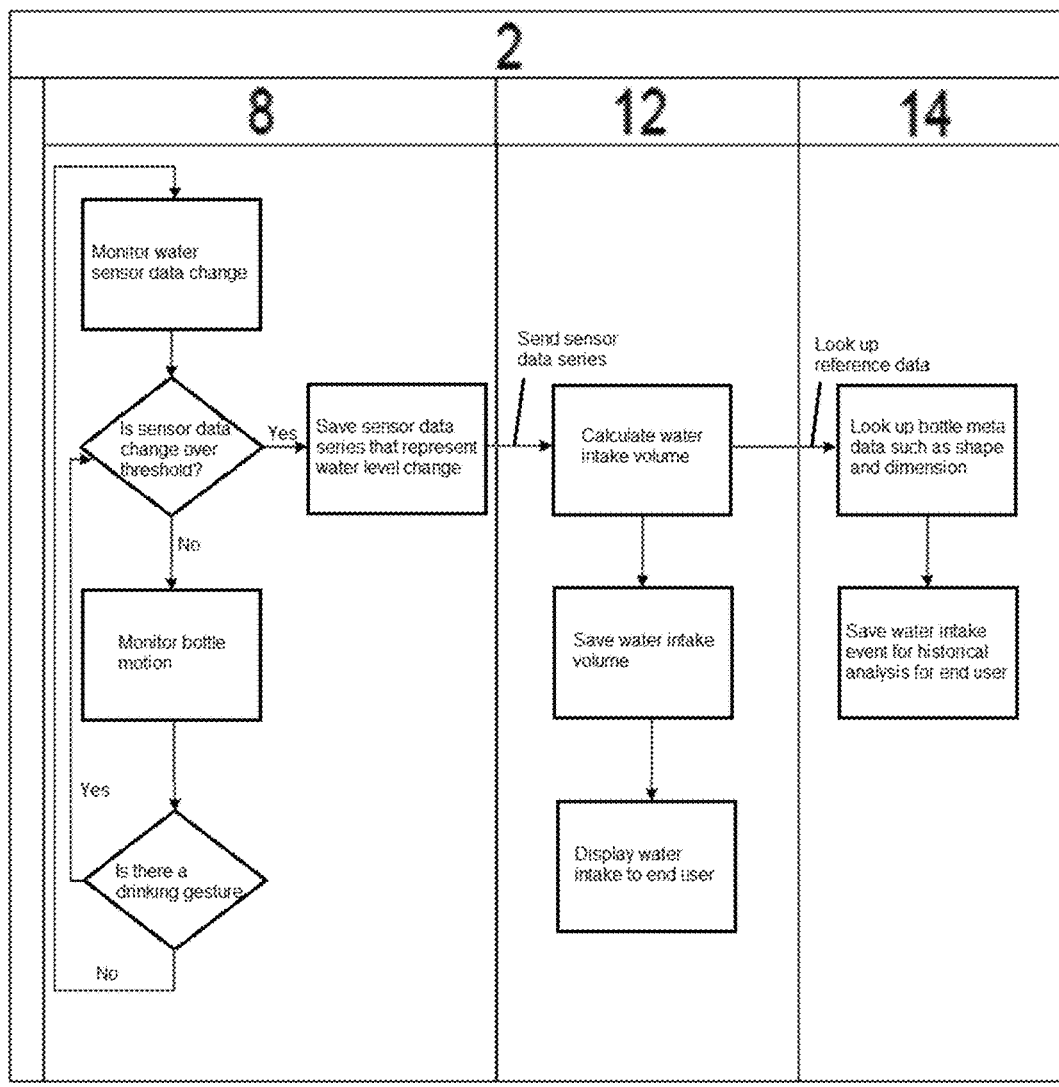
FIG. 11 is a flow chart of a fluid tracking system comprising a sensing device, an electronic device, and an application.

Now referring to FIG. 11, a flow chart for an exemplary fluid tracking system 2 is provided. Similar to the system 2 shown in FIG. 1, the fluid tracking system 2 shown in FIG. 11 comprises a sensing device 8, an electronic device 12, and an application 14 that are configured to track the consumption of water from a water bottle. A fluid sensor and an orientation sensor monitor volumetric changes to the fluid and the bottle's physical positions, respectively. When the fluid sensor data or orientation sensor data changes beyond a certain threshold, the sensing device 8 creates an event dataset with a time series of the fluid sensor data and the orientation sensor data. This event dataset may be sent to an electronic device 12 to confirm that a drinking event has taken place and to compute a volume change of water using the time series of the fluid sensor data, the orientation sensor data, and bottle meta data.

The electronic device 12 may reference bottle meta data from an application 14, and the bottle meta data may include the type of fluid and orientation sensors used, the dimensions of the bottle, the density of the fluid, etc. The bottle meta data may be uploaded to the application 14 by a user, a manufacturer, a distributor, etc. Once the volume change of water has been calculated, the data may be saved to the application 14, and the volume change of water may be presented to a user via a display unit of the electronic device 12. A presentation to the user may include alerts, notifications, warnings, the volume change of water, or any other similar presentations discussed elsewhere herein.

Figure 12:
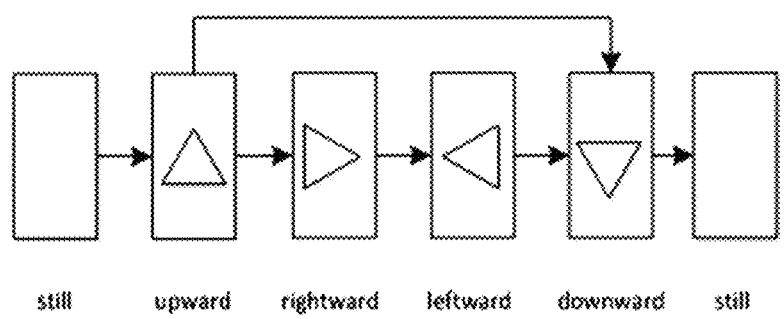
FIG. 12 is a diagram of drinking gestures detected by an orientation sensor.

Now referring to FIG. 12, a sequence of motions as detected by an orientation sensor is provided. In this particular sequence a still container is raised upward, rightward and leftward. Then the container is lowered downward to a resting position. The upward and downward motion bookended by stillness indicates a drinking gesture has occurred. The resulting event dataset is transmitted to the electronic device 12 and/or the application 14 for interpretation, storage, alerts, etc.

Figure 13:
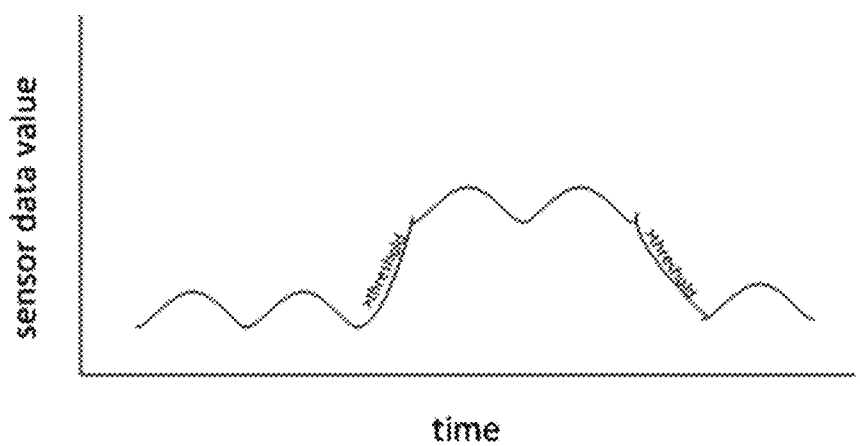
FIG. 13 is a graph of sensor data where the x axis represents time and the y axis represents readings from the sensor.

Now referring to FIG. 13, an example of an event dataset is provided where the x axis is time and the y axis is readings from a sensor. As described above, when the fluid sensor data or orientation sensor data changes beyond a certain threshold, the sensing device creates an event dataset with a time series of the fluid sensor data and the orientation sensor data. As shown in FIG. 13, a threshold is a change in value that exceeds the steady state readings from the sensor. The threshold may be an absolute value, or in other embodiments the threshold may be a relative change in the sensor readings. For example, a relative change of +/−5% over a trailing average of sensor readings.

Now referring to FIG. 14, an exemplary data structure is provided. Sensor data is recorded in time increments in these data structures. The sensor data may include data from a pressure sensor, a capacitance sensor, and/or an orientation sensor. In some embodiments, the fluid sensor is a pressure transducer which outputs pairs of integers. This data is then analyzed by the microcontroller, electronic device, or application for various functions, for example, determining whether a drinking gesture has occurred.

Figure 15:
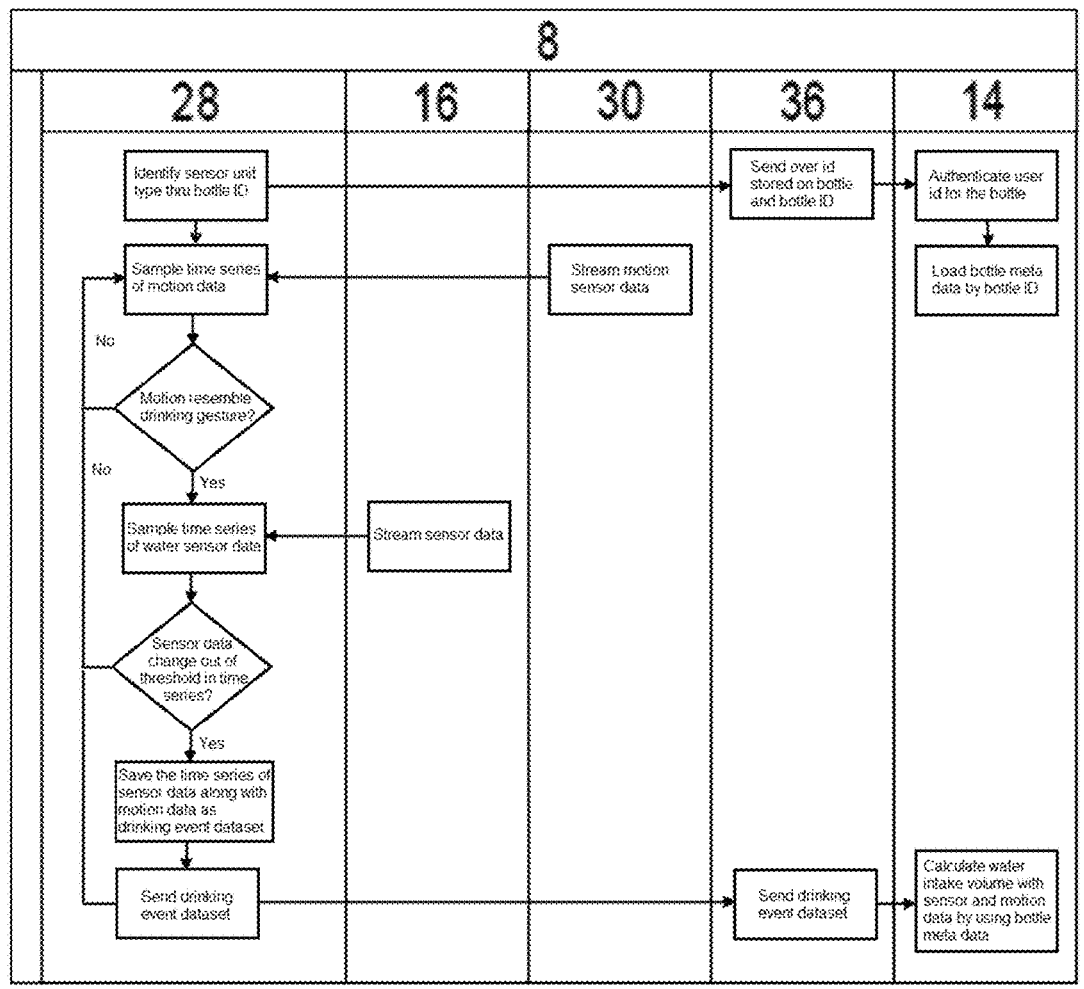
FIG. 15 is a flow chart of a sensing device and the sensing device's communication with an application.

Now referring to FIG. 15, a flow chart for communication between a sensing device 8 and an application 14 is provided. The sensing device 8 comprises a microcontroller 28, a fluid sensor 16, an orientation sensor 30, and a communication unit 36, among other components. When a power unit of the sensing device 8 turns on, an identification reader of the sensing device 8 reads an identification unit of a container. The microcontroller 28 sends this data to the application 14 via the communication unit 36. Specifically, the communication unit 36 is in electronic communication with an electronic device where the application 14 may reside. In alternative embodiments, the electronic device is in electronic communication with a remote application that is located, for example, on a server. The application 14 receives data regarding the sensing device's 8 different sensors and the container's physical dimensions, which can be used to calculate a volumetric change of a fluid in the container.

When a drinking gesture is detected, the collected fluid sensor data is examined to determine if there has been a volumetric change of the fluid. If there has been a volume change, the sensing device 8 creates an event dataset which include time data and data from the fluid sensor and/or orientation sensor for the time period of the drinking gesture. This event dataset is sent to the application 14 via the communication unit 36 where the earlier-sent bottle data is used to compute a volumetric change of the fluid. The change in volume may be reported to the user in various forms. The sensing device's 8 communication unit 36 may also be used to download software or firmware updates from the application 14. The firmware update may be distributed to the application 14 from a web-based application.

Figure 16:
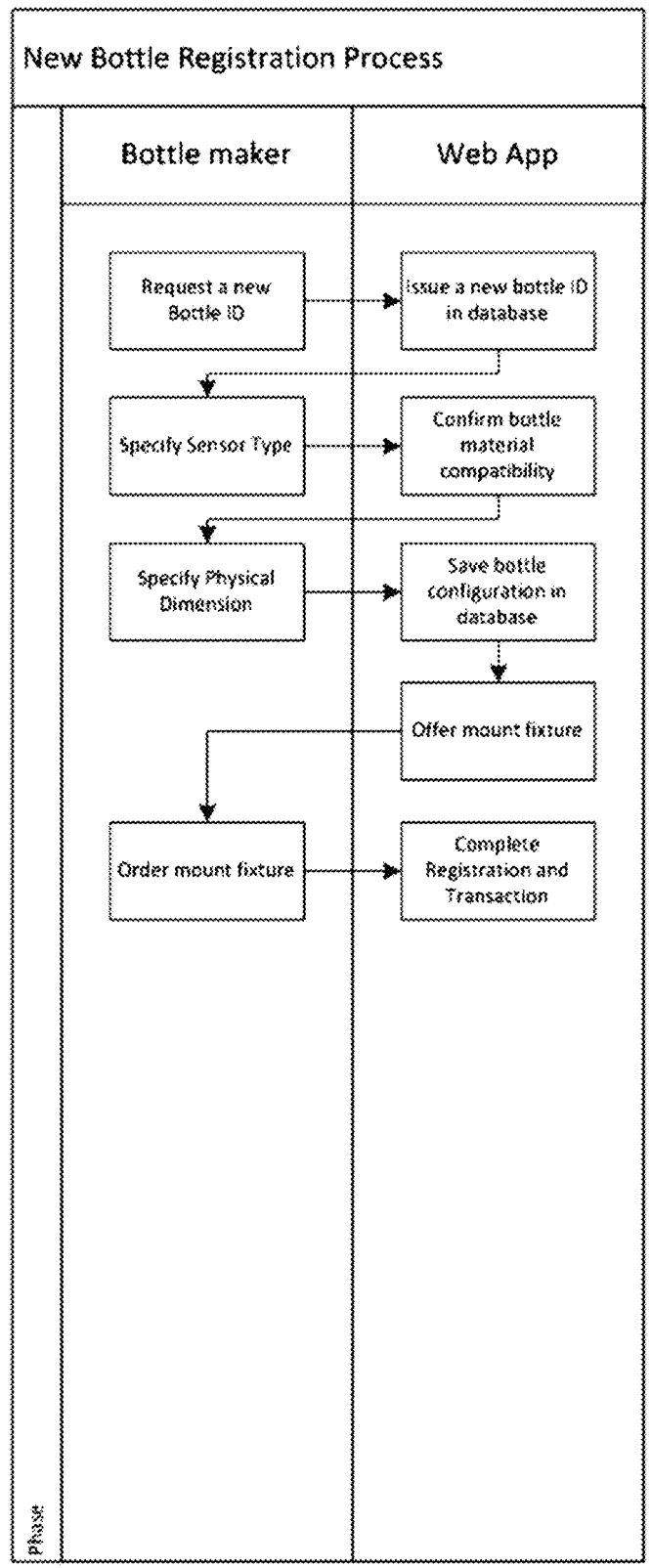
FIG. 16 is a flow chart of a bottle registration process or method.

Now referring to FIG. 16, an exemplary procedure or method is shown for inputting bottle meta data and/or sensor specifications. As discussed above, having a record of the physical dimensions of the bottle and the specifications of the sensing device's sensors may be necessary to compute a volumetric change of the fluid. In the embodiment in FIG. 16, a bottle maker is using a web-based application to request bottle meta data, or a bottle ID, that corresponds to one of the bottle maker's products. Once the various fields have been entered for the bottle ID, the bottle maker may order identification units from the web-based application, then produce and distribute containers that have the identification unit with the bottle ID and its associated meta data.

The producer of the sensing devices may update is various databases and servers to account for the new bottle ID and its associated meta data.

Figure 17:
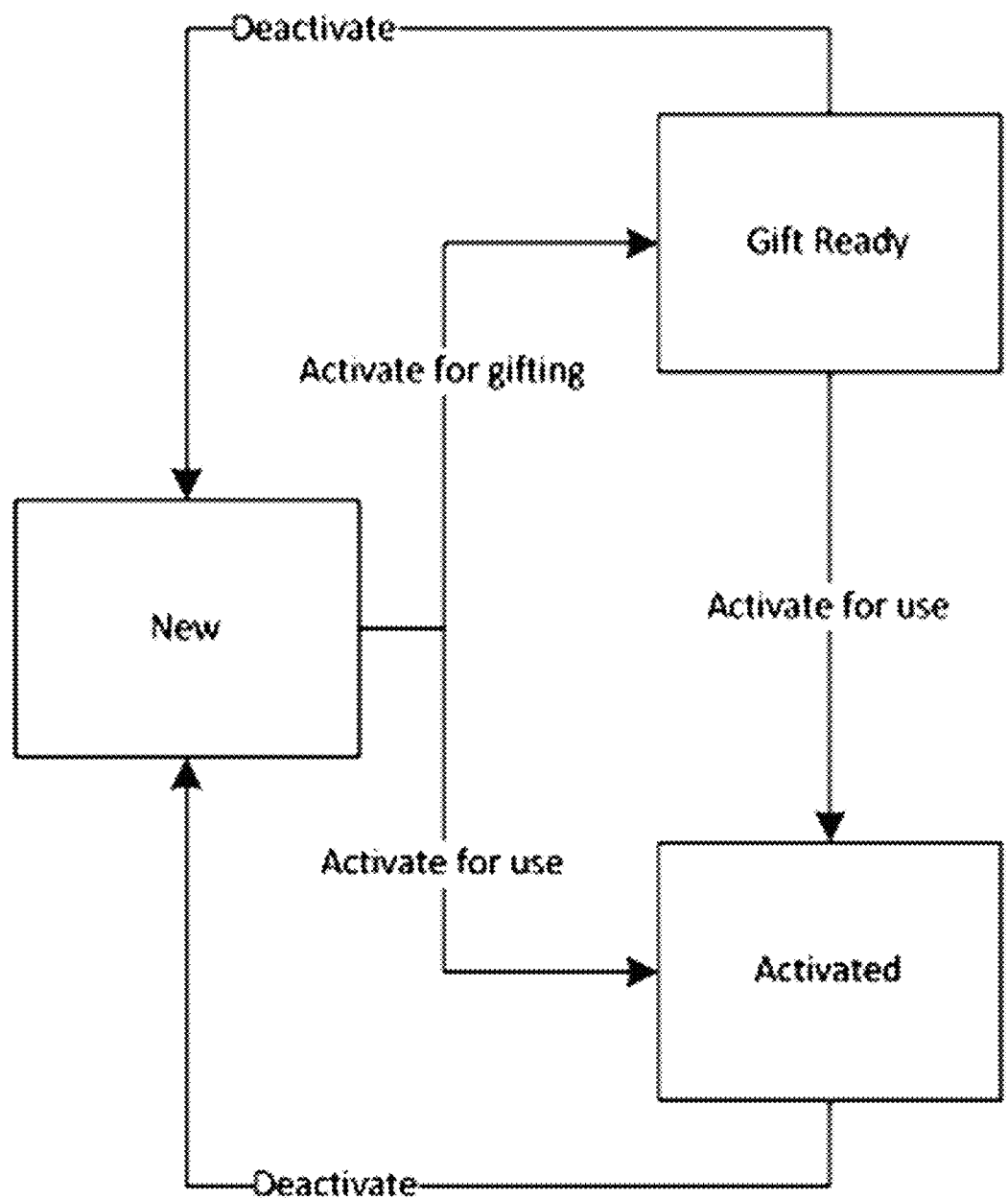
FIG. 17 is a flow chart of a bottle activation process or method.

Now referring to FIG. 17, a procedure or method for activating a sensing device is provided. The sensing device has three states: "New," in this state the sensing device is not usable but can be either activated for use or for gift; "Gift Ready," in this state the sensing device is not usable but can be activated by gift receiver, a gift giver's User Token is stored on the device; "Activated," in this state the sensing device can be used, and an end user's User Token is stored on the sensing device. The User Token is a security feature that ensures that the sensing device is used only by the user who activated the sensing device.

Figure 18:
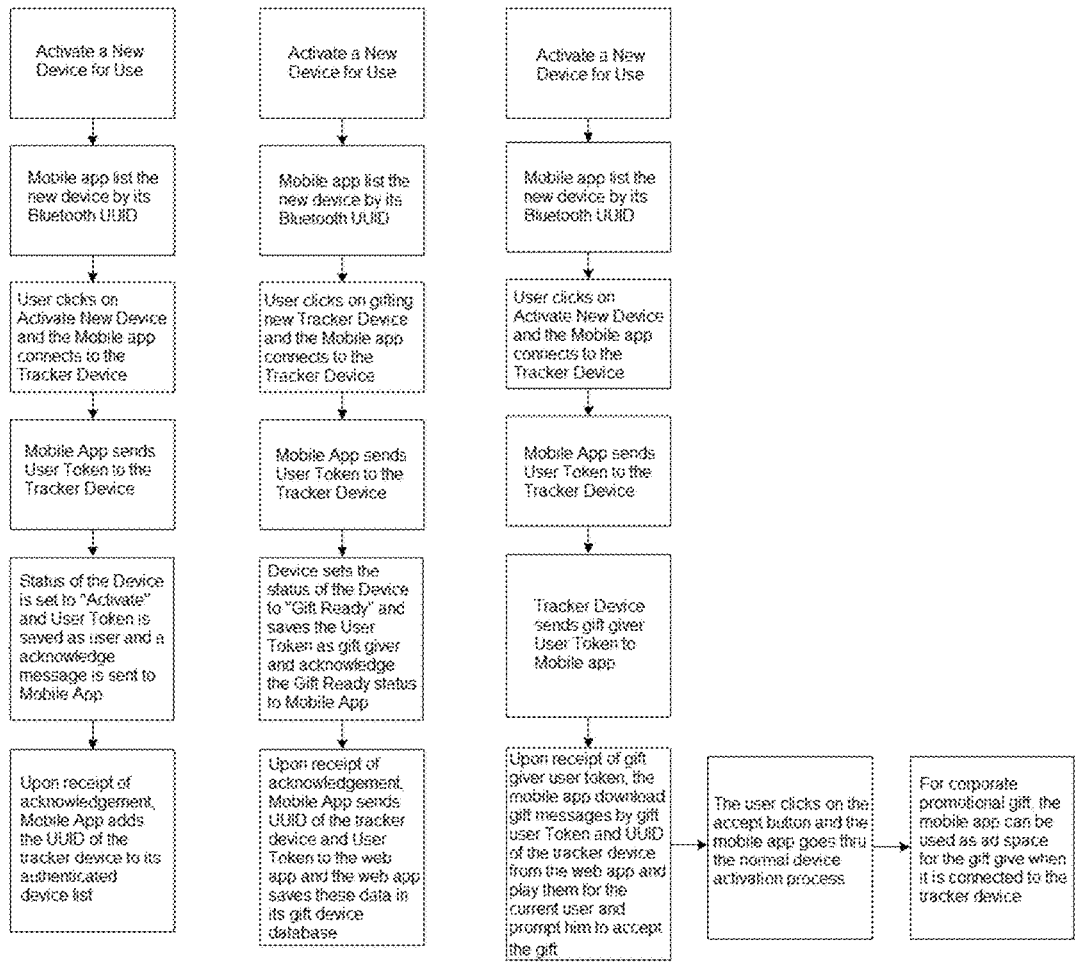
FIG. 18 is various flow charts for bottle activation processes or methods.

Now referring to FIG. 18, several procedures for activating a sensing device are provided. An activated sensing device can be used from an application on an electronic device, but in some embodiments, the sensing device can only be used by the user who activated it. The gift giver and the gift device ID may be stored in the electronic device and/or a web-based application on a server. The electronic device, the application on the electronic device, and the electronic device's display unit may be used as advertising space for corporate gift giver, who can manage advertisements using the web-based application.

Figure 19:
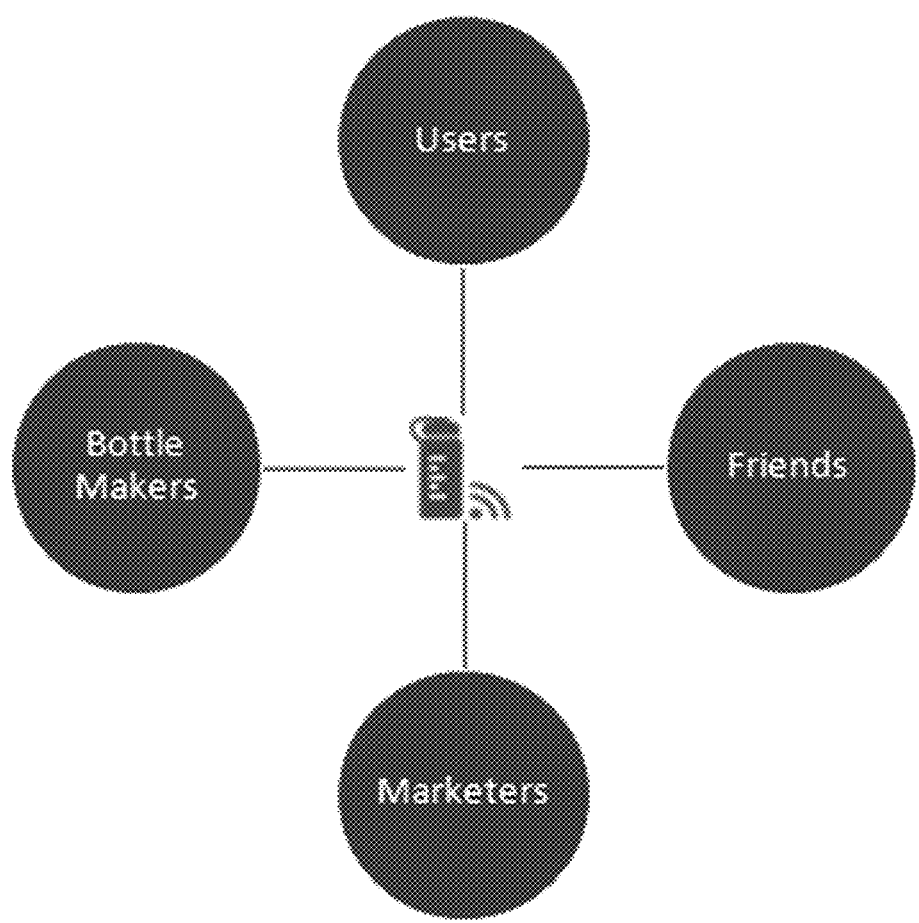
FIG. 19 is a diagram of various entities in communication with each other via a fluid tracking system and/or a sensing device.

Now referring to FIG. 19, a diagram of various entities related to the invention is provided. The sensing device and the overall fluid tracking system may serve as an intersection for users, friends, marketers, bottle makers, etc. The user may refer to the person who uses the container and its associated fluid and who produces the volumetric change of the fluid. Friends may refer to people who also own a sensing device-enabled container and who are friends with other users. Thus, a plurality of friends may form a social network where friends may share notifications, alerts, goals, etc. with each other. Bottle makers may refer to any manufacturer that creates and/or distributes containers. The sensing device enables bottle makers to remain engaged with its consumers even after the initial purchase of the sensing device. Marketers may refer to any entity that wishes to buy or sell advertising space related to the fluid tracking system. The invention described herein allows these various entities to communicate with each other via the fluid tracking system, wherein these entities may not have communicated without the invention.

Figure 20:
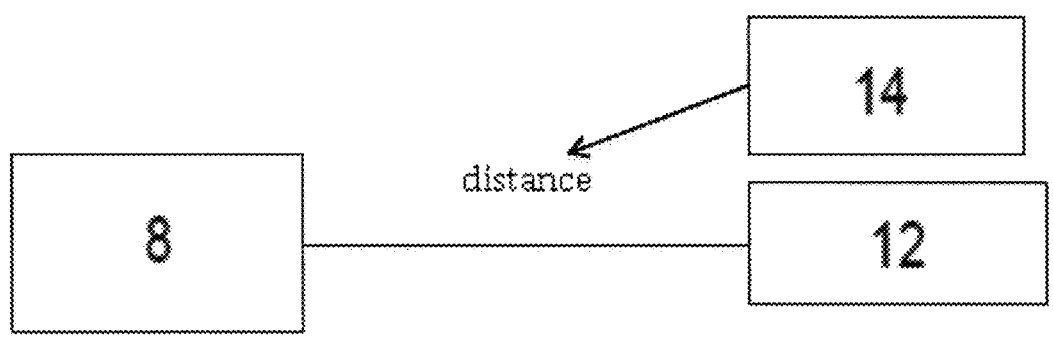
FIG. 20 is a diagram of a reminder feature of a fluid tracking system.

Now referring to FIG. 20, a diagram of reminder feature is provided wherein an electronic device 12 may provide an alert to the user when the electronic device 12 is too far removed from a sensing device 8 and a container. The alert helps a user avoid forgetting or leaving the container and the sensing device 8 at a location. As shown in FIG. 20, the sensing device 8 is in electronic communication with the electronic device 12, and an application 14 in this embodiment resides on the electronic device. As discussed above, Bluetooth® is a protocol that may be utilized to establish the electronic communication between the sensing device 8 and the electronic device 12. The application 14 may monitor the signal strength of the Bluetooth® electronic communication, which generally corresponds to the distance between the sensing device 8 and the electronic device 12, and when the strength drops below a threshold value, an alert is provided to the user on the electronic device 12.

Additional feature may be incorporated into the reminder feature. For example, a sensing device 8 may be equipped with LED lights, audible signal capabilities, etc. that activate when the Bluetooth® signal strength drops below a threshold value. These signals serve to help a user locate the sensing device 8 and the container.

It will be appreciated that embodiments of the invention may be applied to other devices beyond container such as bottles. For example, embodiments of the invention may be applied to food containers used in restaurant kitchens to track the use of various ingredients. Multiple sensing devices and systems may be networked together such that a restaurant may track which ingredients are needed and which ingredients are fully stocked. Instead of reminders to drink water from a water bottle, reminders may be sent to a restaurateur to buy more ingredients.

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed.

The phrases "at least one", "one or more", and "and/or", as used herein, are open-ended expressions that are both conjunctive and disjunctive in operation. For example, each of the expressions "at least one of A, B, and C", "at least one of A, B, or C", "one or more of A, B, and C", "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification, drawings, and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having," and variations thereof, is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts, and the equivalents thereof, shall include all those described in the summary of the invention, brief description of the drawings, detailed description, abstract, and claims themselves.

The foregoing description of the invention has been presented for illustration and description purposes. However, the description is not intended to limit the invention to only the forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Consequently, variations and modifications commensurate with the above teachings and skill and knowledge of the relevant art are within the scope of the invention. The embodiments described herein above are further intended to explain best modes of practicing the invention and to enable others skilled in the art to utilize the invention in such a manner, or include other embodiments with various modifications as required by the particular application(s) or use(s) of the invention. Thus, it is intended that the claims be construed to include alternative embodiments to the extent permitted by the prior art.

What is claimed is:

1. A system for determining a volume of a fluid, comprising:
   a container having a side wall and a bottom wall that define a container shape, said side wall has an aperture;
   a sensing device interconnected to said container, said sensing device comprising:
   an orientation sensor for detecting a spatial orientation of said container;
   a fluid sensor for detecting pressure of said fluid in said container through said aperture in said side wall, wherein after said orientation sensor detects a change in said spatial orientation of said container, said sensing device generates an event dataset with said pressure of said fluid and container orientation information; and
   a microprocessor configured to transmit said event dataset to an electronic device, wherein said electronic device determines a coverage of said fluid over said bottom wall based on said container shape, said pressure of said fluid, and said spatial orientation of said container,
   wherein, if said coverage is a partial coverage of said fluid over said bottom wall, said electronic device determines a first volume of said fluid in said container, wherein, if said coverage is a full coverage of said fluid over said bottom wall, said electronic device determines a second volume of said fluid in said container, and wherein said second volume is distinct from said first volume.

2. The system of claim 1, wherein said orientation sensor comprises a plurality of accelerometers configured to detect said spatial orientation of said container in three spatial dimensions.

3. The system of claim 1, wherein said electronic device determines a change in said volume of said fluid based on at least one of a series of first volumes, a series of second volumes, and a series of said first and second volumes.

4. The system of claim 1, further comprising:
   an identification system of said sensing device, wherein said identification system is configured to store said container shape in a non-transitory computer-readable storage medium.

5. The system of claim 1, wherein said fluid sensor further detects said pressure of said fluid in said container as being an ambient pressure, and said electronic device determines a maximum possible residual of said fluid in said container based on said container shape and said spatial orientation of said container.

6. The system of claim 1, wherein said container shape is cylindrical.

7. The system of claim 1, wherein a user token of said electronic device and a unique identifier of said sensing device are associated with each other and stored on a database.

* * * * *